US007523252B2

(12) United States Patent
Honma (10) Patent No.: US 7,523,252 B2
(45) Date of Patent: Apr. 21, 2009

(54) DATA CONTROL APPARATUS FUNCTIONING AS A USB MASS STORAGE DEVICE

(75) Inventor: Masayoshi Honma, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 267 days.

(21) Appl. No.: 11/367,306

(22) Filed: Mar. 6, 2006

(65) Prior Publication Data

US 2006/0212623 A1 Sep. 21, 2006

(30) Foreign Application Priority Data

Mar. 7, 2005 (JP) ............... P. 2005-062981

(51) Int. Cl.
*G06F 12/00* (2006.01)
*G06F 13/00* (2006.01)
*G06F 13/28* (2006.01)
*G06F 12/06* (2006.01)
*G06F 13/12* (2006.01)
*G06F 13/38* (2006.01)
*G06F 13/42* (2006.01)
*G06F 15/00* (2006.01)
*G01D 1/00* (2006.01)
*G06M 11/04* (2006.01)

(52) U.S. Cl. ............ 711/111; 710/62; 710/105; 702/127; 711/2; 711/112; 711/170

(58) Field of Classification Search ............ 711/112
See application file for complete search history.

(56) References Cited

U.S. PATENT DOCUMENTS

| 6,393,493 B1* | 5/2002 | Madden et al. ............ 719/321 |
| 6,412,028 B1* | 6/2002 | Steed et al. ............ 710/22 |
| 6,915,355 B2* | 7/2005 | Genin ............ 710/6 |
| 2006/0047465 A1* | 3/2006 | Ousley et al. ............ 702/127 |

FOREIGN PATENT DOCUMENTS

JP 2004-53513 A 2/2004

OTHER PUBLICATIONS

The Application And Design of USB Flash Memory in Data Acquisition, Wang Lei, Ma Wanli, Yao Chenghu, Chinese Journal of Scientific Instrument, vol. 25, No. 4(supplement), 229-227, Aug. 2004.

* cited by examiner

*Primary Examiner*—Kevin L Ellis
*Assistant Examiner*—Ryan Bertram
(74) *Attorney, Agent, or Firm*—Sughrue Mion. PLLC (57) ABSTRACT

A data control apparatus has a user interface section, an operation control section which operates based on an instruction from the user interface section, a USB device interface section which is connected to an external equipment, and controls USB communications with the external equipment, a file system control section which transfers data to and from the operation control section, and controls a file, an internal storage which stores data from the file system control section and data from the external equipment, and a USB mass storage class control section which controls a USB mass storage class, wherein the USB device interface section controls so that the external equipment identifies the data control apparatus as an external storage, and transfers to and from the external equipment.

8 Claims, 9 Drawing Sheets

PRIOR ART

*FIG. 9*

DATA CONTROL APPARATUS FUNCTIONING AS A USB MASS STORAGE DEVICE

CROSS-REFERENCE TO RELATED APPLICATIONS

This application is based upon and claims the benefit of priority from the prior Japanese Patent Applications No. 2005-062981, filed on Mar. 7, 2005, the entire contents of which are incorporated herein by reference.

BACKGROUND OF THE INVENTION

1. Field of the Invention

This invention relates to an improvement in a data and signal transfer function in a data control apparatus to be connected to an external equipment such as a host computer for transferring a signal and data.

2. Description of the Related Art

For example, for a generator such as a signal generator for outputting some data and signal to an object, the data and signal output by the generator are retained in an external equipment, for example, a host computer and a necessary signal and data are given to the generator. According to such a configuration, the components of the generator such as memory for storing the data output to the object and a memory controller can be lessened.

Likewise, in a measuring equipment for executing some measurement, the measurement result is given to an external equipment. As the measurement result is not stored in the measuring equipment, the memory of the measuring equipment for retaining the measurement result can be lessened.

The signal generator and the measuring equipment transfer some data to and from an external equipment and control the transfer operation and therefore will be hereinafter collectively called data control apparatus.

Figure 7:
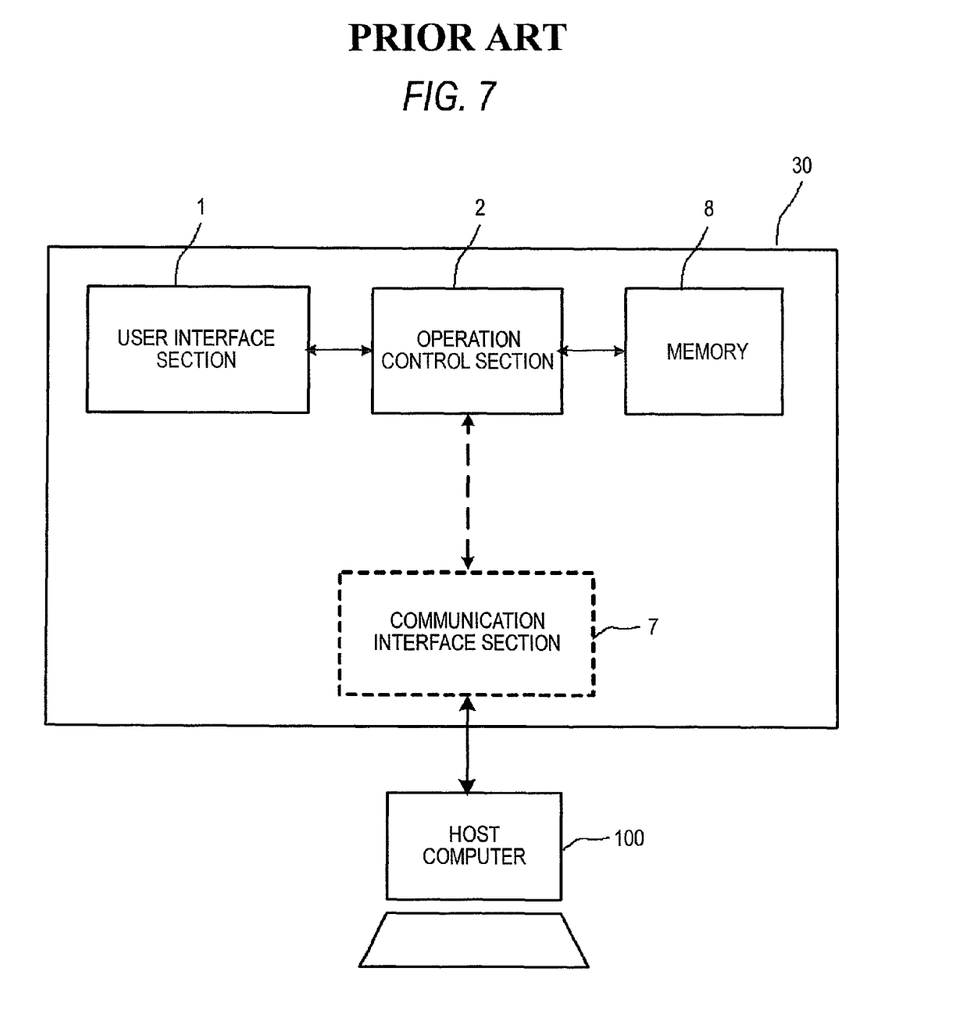
FIG. 7 is a connection state schematic representation of an external equipment and an apparatus according to a related art.

As means for giving data from an external equipment to a data control apparatus and means for giving the measurement result from a data control apparatus to an external equipment, the following are possible: FIG. 7 shows a configuration example wherein a data control apparatus and an external equipment are connected through a dedicated interface such as RS232C or GP-IB for transferring data.

In FIG. 7, an operation control section 2 of a data control apparatus 30 has a signal and data generation function or a measurement function. The data control apparatus 30 is connected to an external equipment 100 through a communication interface section 7 and the operation control section 2 operates according to a command of a user interface section 1 and data is transferred through the operation control section 2 and the communication interface section 7 to and from the external equipment 100. The external equipment 100 and the data control apparatus 30 are operated by a dedicated communication command through the communication interface section 7.

Figure 8:
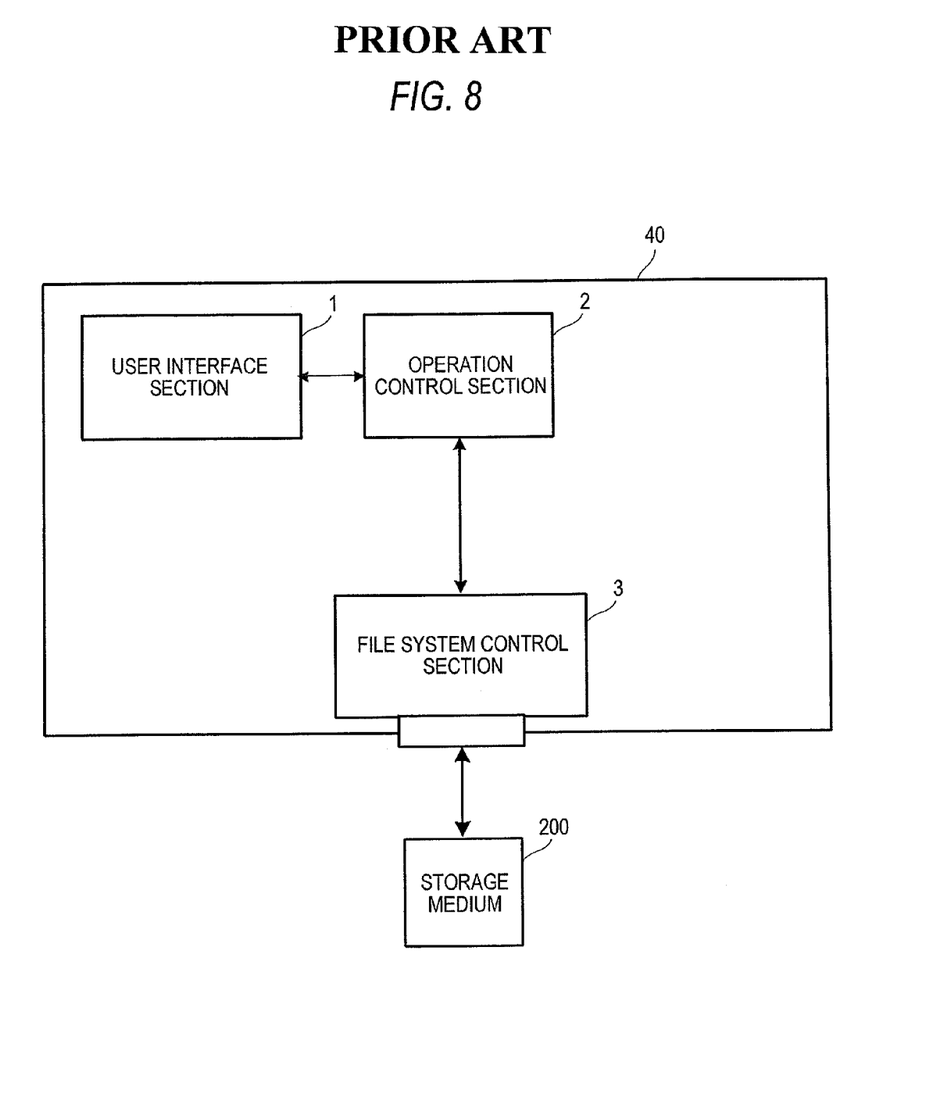
FIG. 8 is another connection state schematic representation of an external equipment and an apparatus according to a related art.

FIG. 8 shows a configuration example wherein data is transferred between a data control apparatus and an external equipment via a removable storage medium of an FDD, etc. In FIG. 8, an operation control section 2 of a data control apparatus 40 operates according to a command of a user interface section 1 and data (file) is transferred through the operation control section 2 and a file system control section 3 to and from a storage medium 200.

Figure 9:
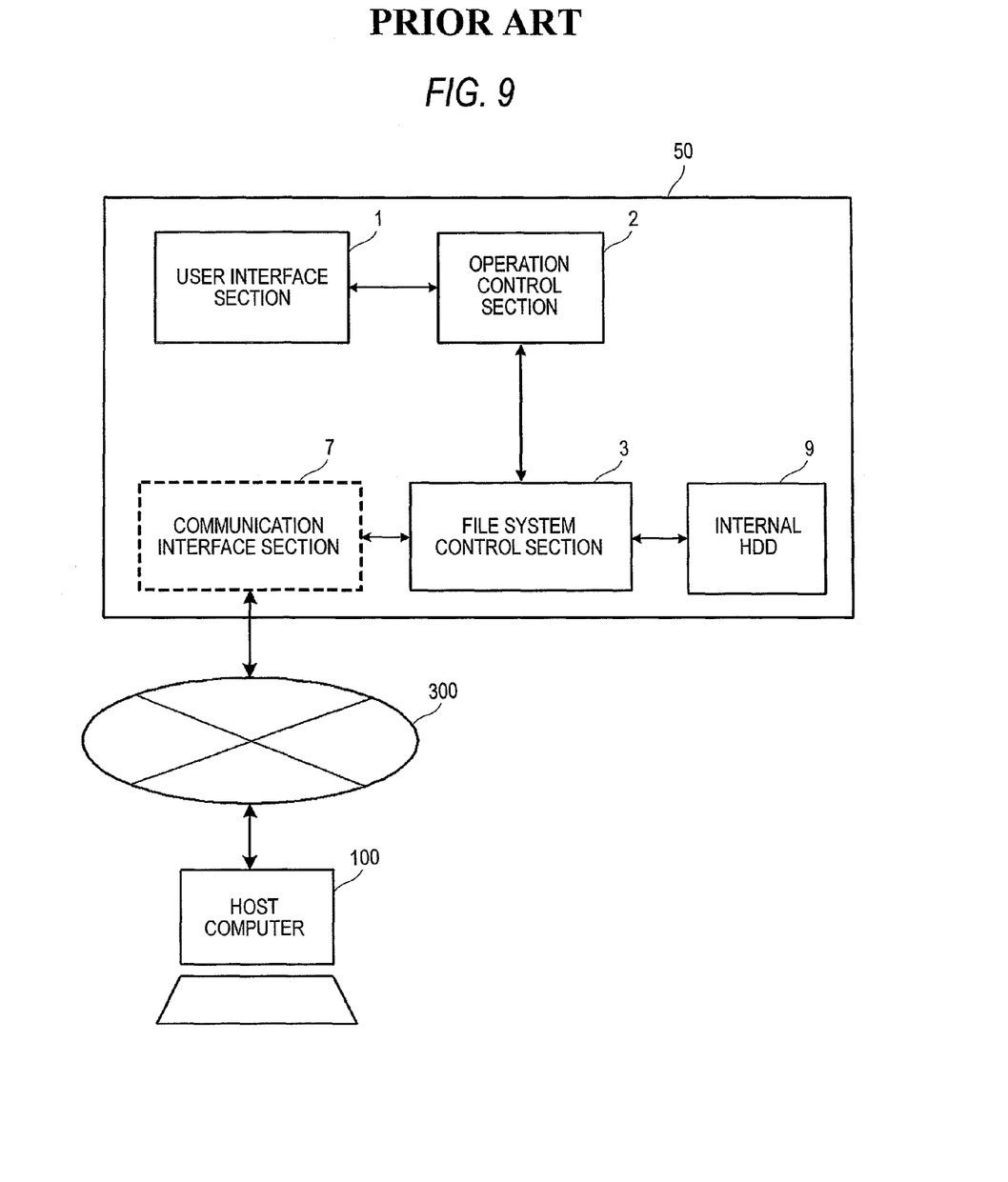
FIG. 9 is another connection state schematic representation of an external equipment and an apparatus according to a related art.

FIG. 9 shows a configuration example wherein data is transferred between a data control apparatus and an external equipment through a network. In FIG. 9, a communication interface section 7 of a data control apparatus 50 is connected to an external equipment 100 through a network 300. An operation control section 2 of the data control apparatus 50 operates according to a command of a user interface section 1 and data (file) is transferred through the operation control section 2 and a file system control section 3 to and from the external equipment 100.

As a measuring equipment requiring this kind of function, for example, in a waveform measuring equipment, etc., the data amount of the waveform, etc., processed in the measuring equipment grows and the computation amount also increases with improvement of the analysis function, resulting in large load on the measuring equipment; this is a problem.

Hitherto, to solve this problem, a general-purpose computer has been connected to a measuring equipment and has performed processing involving computations taking much time and has transmitted the result to the measuring equipment.

JP-A-2004-53513 is referred to as a related art.

JP-A-2004-53513 discloses a configuration wherein a measuring equipment and a general-purpose computer are connected through a network for transferring data therebetween.

In the configuration in FIG. 7, the external equipment and the data control apparatus are connected through the dedicated communication interface and thus a dedicated command to the data control apparatus needs to be used and to transfer data, the user needs to create a program using the command and operate the program in the external equipment such as a host computer. Particularly, for input/output of a data string, the data format varies from one equipment to another and program creation becomes intricate. In addition, expert knowledge is required for program creation and a work burden is also placed on the user.

In the configuration in FIG. 8, the standard of a removal storage medium is rapidly changed or discarded and often does not match the lifetime of a data control apparatus. For example, a floppy (registered trademark) disk drive is still included in a personal computer as standard equipment; in fact, however, it is less used. Generally, JAZZ ZIP, etc., is scarcely used. Thus, it may become impossible to write or read the data stored on a storage medium as the standard is changed.

In the configuration in FIG. 9, it is assumed that the used network is a network such as Ethernet (registered trademark) and to transfer data, the data control apparatus and the external equipment need to be associated with each other and unique addresses in the network, such as IP addresses need to be assigned.

Then, data transfer is made possible. However, for example, at an experiment site, etc., a generator and a measuring equipment are used temporarily at the necessary time and the system is modified frequently. Setting the unique addresses each time is intricate work for the user. That is, the unique addresses in the network are the resources of the network and acquiring and returning the unique addresses from and to the network administrator are intricate.

SUMMARY OF THE INVENTION

An object of the invention is to provide a data control apparatus for eliminating the need for setting work as a burden on the user and making it easy to transfer data simply just as the data control apparatus is connected to an external equipment such as a host computer.

The invention provides a data control apparatus, having: a user interface section; an operation control section which operates based on an instruction from the user interface section; a USB device interface section which is connected to an external equipment, and controls USB communications with the external equipment; a file system control section which transfers data to and from the operation control section, and controls a file; an internal storage which stores data from the file system control section and data from the external equipment; and a USB mass storage class control section which controls a USB mass storage class, wherein the USB device interface section controls so that the external equipment identifies the data control apparatus as an external storage, and transfers to and from the external equipment.

In the data control apparatus, a part of ROM and a part of RAM in a CPU constitute the internal storage, and the file system control section includes a ROM file system control section corresponding to the part of the ROM and a RAM file system control section corresponding to the part of the RAM.

The data control apparatus may be a measuring equipment.

The data control apparatus may be a signal generator.

In the data control apparatus, the operation control section stores measurement data which is put into a file by the file system control section in the internal storage, transfers the file to the external equipment through the USB mass storage class control section, and identifies a file of data to be input from the user interface and stored in the external equipment.

In the data control apparatus, the operation control section identifies signal generation data which is input from the user interface and is to be stored in the external equipment through the USB mass storage class control section, and stores the signal generation data in the internal storage, and operates so that a signal is generated based on data put into a file by the file system control section.

In the data control apparatus, data transferred between the external equipment and the data control apparatus is a file in a CSV format.

According to the data control apparatus, the data control apparatus for performing measurement or signal generation includes the USB mass storage class control section, and the data control apparatus is identified as an external storage when the data control apparatus are connected to the external equipment by USB. Therefore, a data file can be easily exchanged between the data control apparatus and the external equipment without the need for an intricate program or setting.

The data file is transferred with usual spreadsheet software intact, for example, and general operation such as double click can be performed and therefore the operation method is extremely easy for the user.

Since data is transferred without the intervention of a storage medium, the user need not care about standard change, form change, etc., of a storage medium.

DETAILED DESCRIPTION OF THE PREFERRED EMBODIMENTS

A data control apparatus according to a first embodiment of the invention will be discussed with reference to FIG. 1. In the figure, an external equipment is a host computer 100. A user interface section 1 of a data control apparatus 10 includes a keyboard for the user to enter a command in the data control apparatus 10 and a display for displaying the result. An operation control section 2 performs signal generation or measurement and is connected to the user interface section 1 for controlling a signal land data generation function and a measurement function.

Internal storage 4 is a storage device for reading/writing in sector units, such as a hard disk or semiconductor storage, and is subjected to file management control by a file system control section 3. The file system control section 3 creates, deletes, writes, reads, etc., a file based on data stored in the internal storage 4.

A USB mass storage class control section 5 controls a protocol (USB mass storage class) for a mass storage device conforming to the USB standard. A USB device interface section 6 is required for conducting USB communications with the host computer 100 and controls a device protocol required for the data control apparatus 10 to operate as a USB device.

If another communication function such as RS232C is required, an interface section 7 for controlling the protocol required for communications may be included in the data control apparatus 10.

Next, the operation of the data control apparatus 10 having the configuration in FIG. 1 will be discussed. First, when the data control apparatus 10 and the host computer 100 are connected by USB, enumeration occurs between the host computer 100 and the USB device interface section 6. The enumeration is a procedure executed by the host when a USB-compatible peripheral equipment is connected, and is to acquire information to know what equipment is connected. When the data control apparatus 10 is identified by enumeration, an address is assigned and a communication path is established.

If it is identified that the data control apparatus 10 is of mass storage class at the enumeration time, a mass storage driver built in an operating system (OS) of the host computer 100 is used. After this, the host computer 100 accesses the data control apparatus 10 using the protocol of the mass storage driver and thus the USB mass storage class control section 5 identifies it and reads/writes the internal storage 4 in response to a read/write request in sector units. Accordingly, the portion surrounded by the alternate long and short dashed line in FIG. 1 functions as external storage of the host computer 100.

Since the internal storage 4 is shared by the host computer 100 and the operation control section 2, when the internal storage 4 is updated, the host computer 100 and the operation control section 2 (data control apparatus 10) need to be synchronized with each other. That is, when the internal storage 4 is updated, an event signal is generated between the file system control section 3 and the USB mass storage class control section 5 in FIG. 1 for synchronization.

Specifically, when the host computer 100 rewrites the internal storage 4, at the same time, the USB mass storage class control section 5 generates a synchronous event (A) and sends the synchronous event (A) to the file system control section 3 to inform the file system control section 3 that change occurred in the internal storage 4. When the file system control section 3 is accessed by the operation control section 2 first after the file system control section 3 receives the synchronous event (A), the file system control section 3 again reads the file system for synchronization.

Likewise, when the operation control section 2 rewrites the internal storage 4, at the same time, the file system control section 3 generates a synchronous event (B) and sends the synchronous event (B) to the USB mass storage class control section 5 to inform the USB mass storage class control section 5 that change occurred in the internal storage 4.

Upon reception of the synchronous event (B), the USB mass storage class control section 5 sends the synchronous event (B) to the host computer 100 through the USB device interface section 6. USB mass storage driver (not shown) of the host computer 100 again reads the file system for synchronization.

After this, USB mass storage operation is performed like operation when a storage device such as a hard disk connected by USB or USB memory is connected to the host computer 100.

Figure 2:
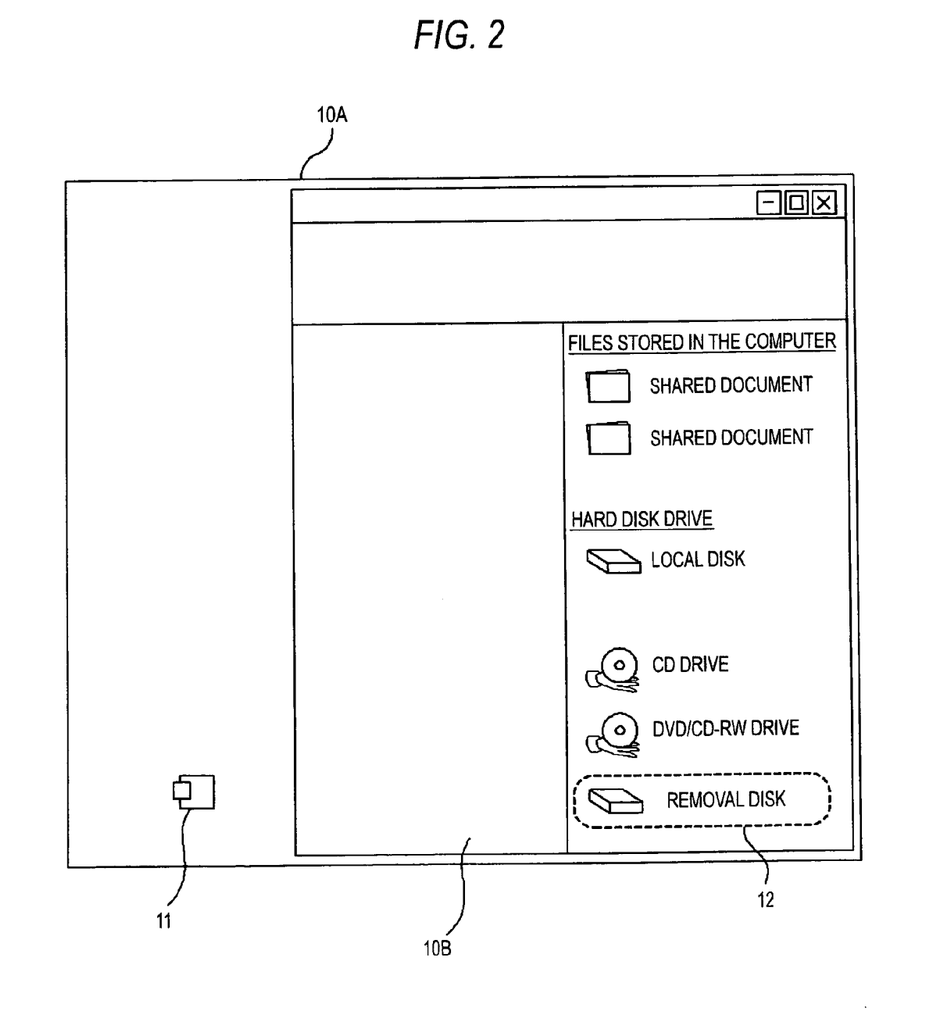
FIG. 2 is a schematic representation of USB mass storage operation according to the invention.

An example of the operation will be discussed with reference to FIGS. 2 to 4. FIG. 2 shows an example of a display screen when the data control apparatus 10 in FIG. 1 is connected to the host computer 100. In FIG. 2, the data control apparatus 10 is displayed in a window 10B on a display screen 10A with a name of "removable disk (12)" as a device involving a removable storage area, and enables the user to format, copy a file, rename a file, create a directory, etc., like a usual disk.

Figure 1:
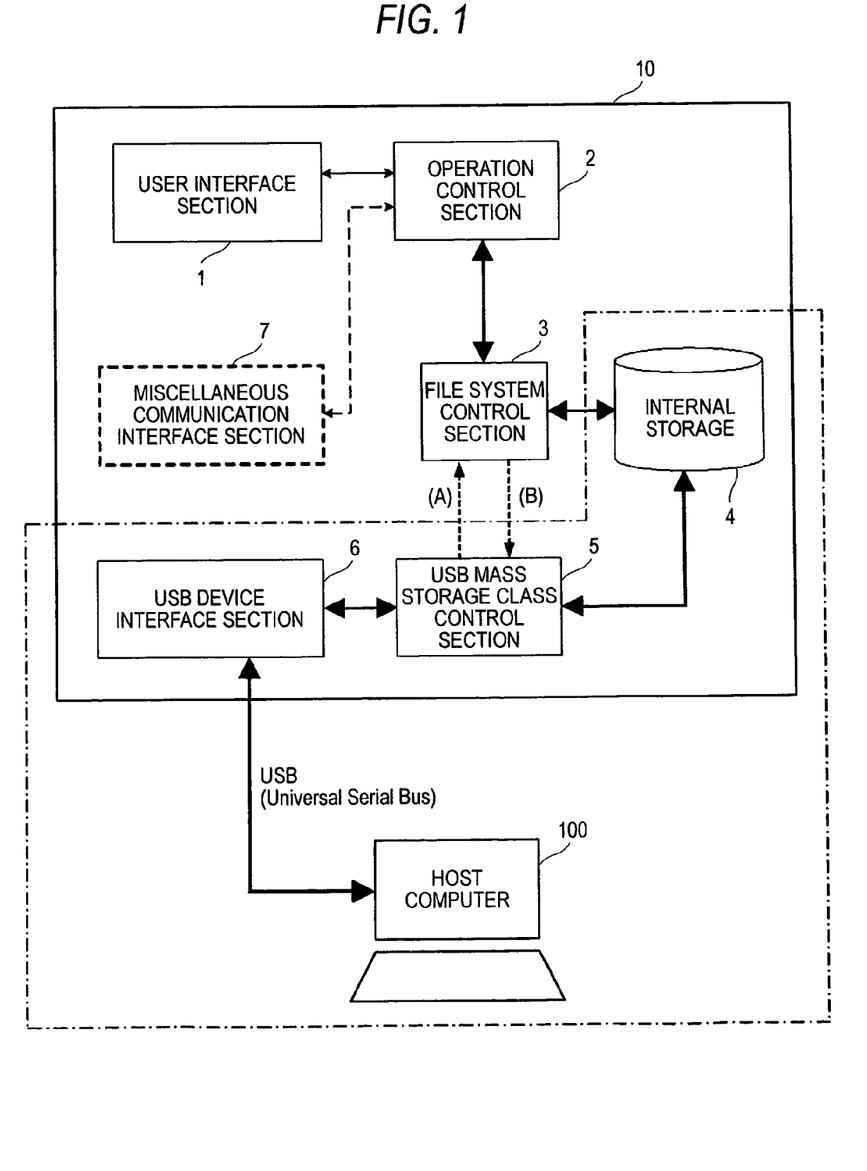
FIG. 1 is a block diagram to show a first embodiment of the invention.
Figure 3:
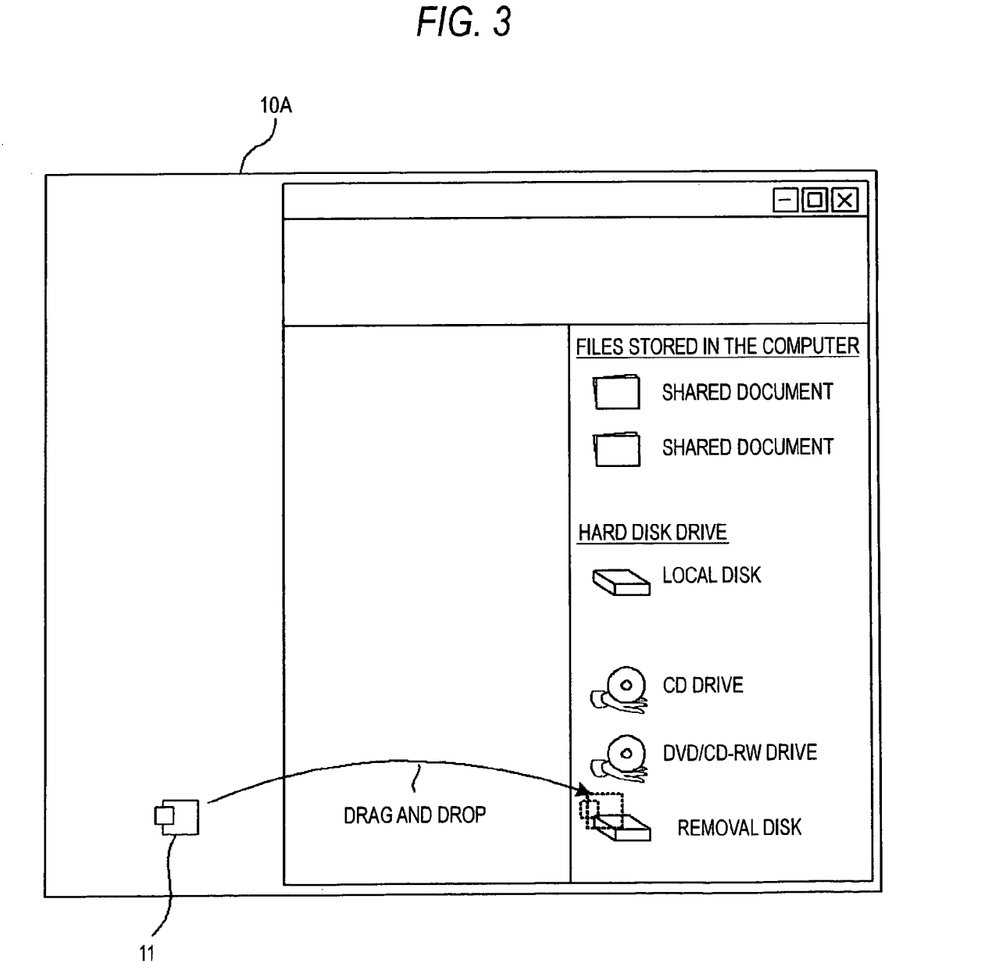
FIG. 3 is a schematic representation of USB mass storage operation according to the invention.
Figure 4:
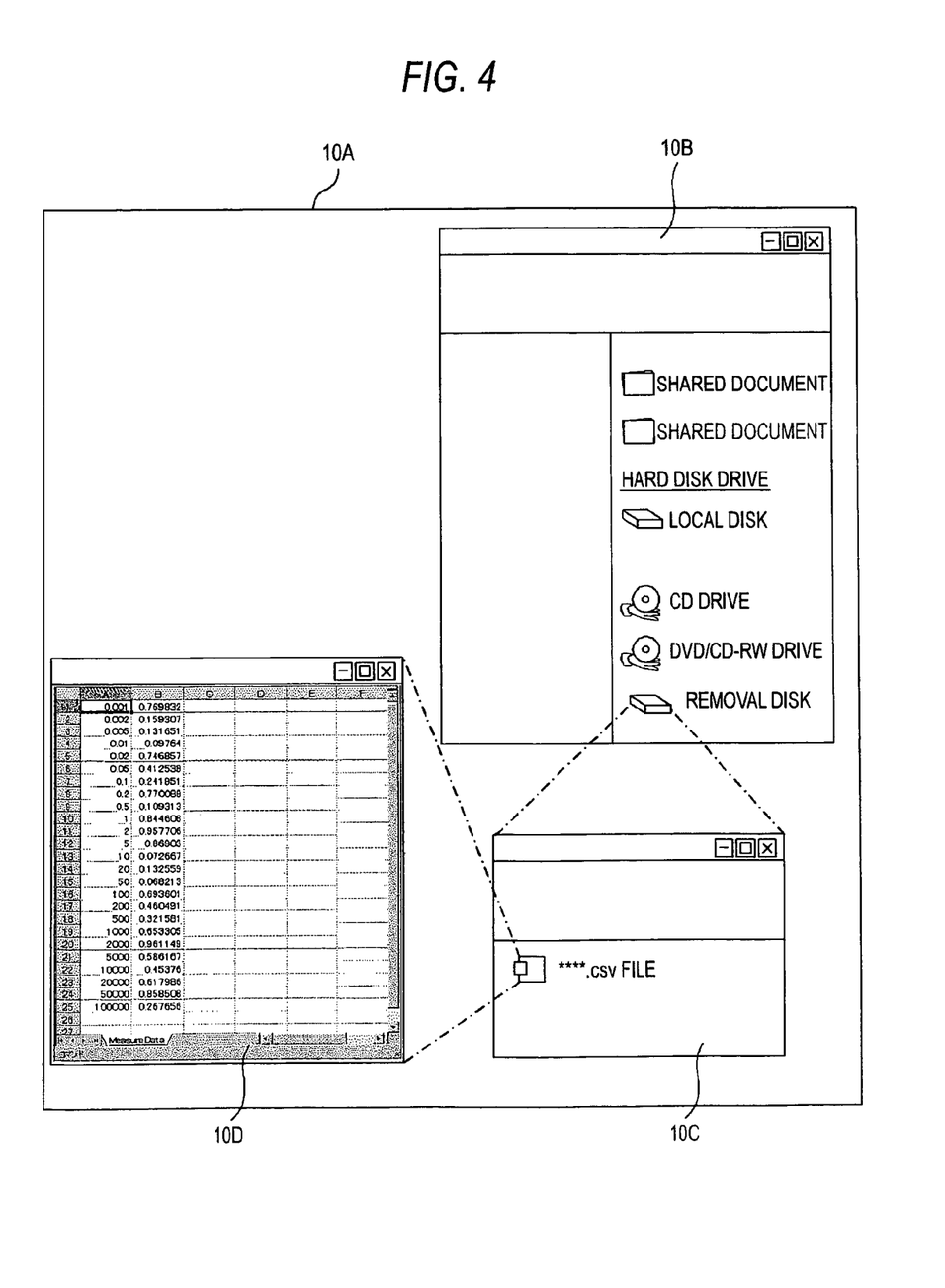
FIG. 4 is a schematic representation of USB mass storage operation according to the invention.

As shown in FIG. 3, when a data file 11 is placed in the host computer 100, if the user drags and drops the data file 11 to the removable disk 12, the data file 11 can be written into the internal storage 4 through the USB mass storage class control section 5 from the USB device interface section 6 in FIG. 1.

It is made possible to handle the file written into the internal storage 4 again as a file through the file system control section 3, and the operation control section 2 can use data in the file. Specifically, as shown in FIG. 4, when the user opens the removable disk 12, the dragged-and-dropped file 11 exists in a window 10C and when the user double-clicks on the file 11 to open a window 10D, directly an application such as a spreadsheet program can be started for read.

The operation of the data control apparatus 10 for the host computer 100 is as follows: A data string file created by the operation control section 2 is stored in the internal storage 4 through the file system control section 3, and the internal storage 4 can be accessed as a file from the host computer 100 through the USB mass storage class control section 5 and the USB device interface section 6. When the user opens the removable disk 12, the file 11 exists and when the user double-clicks on the file 11, directly an application such as a spreadsheet program can be started for read.

Figure 5:
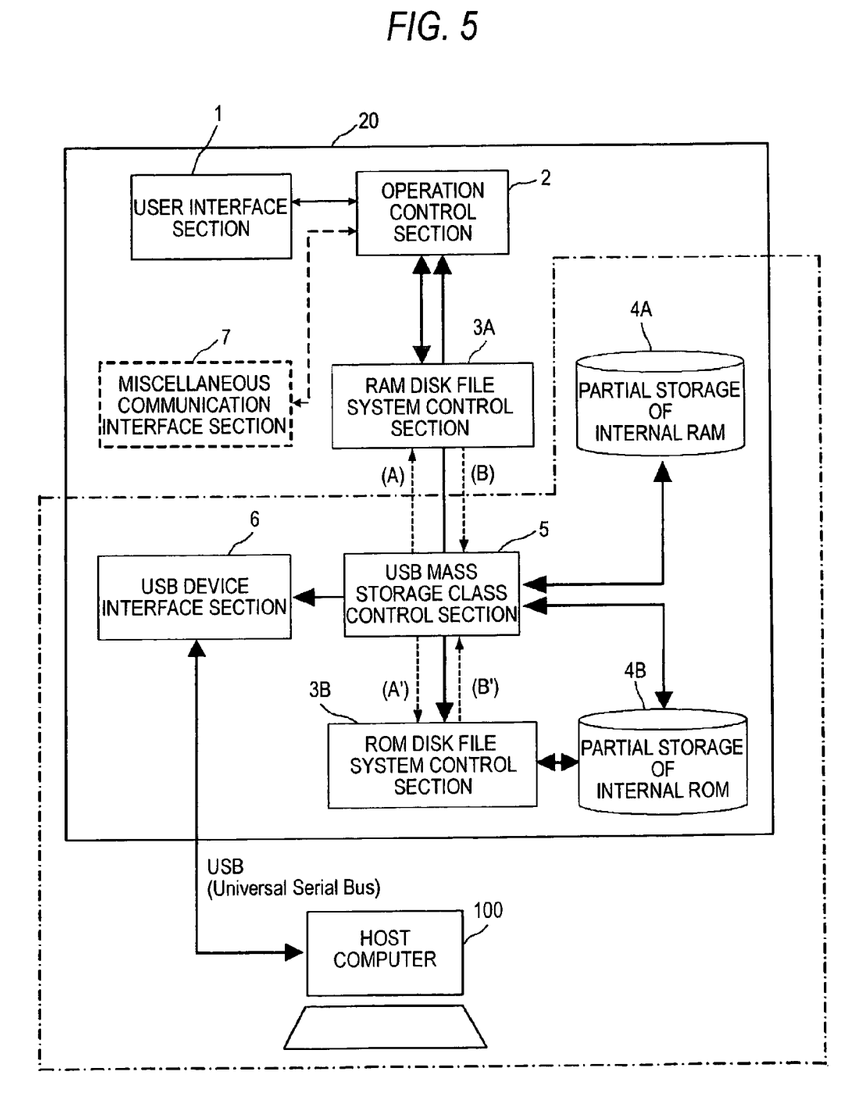
FIG. 5 is a block diagram to show a second embodiment of the invention.

Next, a data control apparatus according to a second embodiment of the invention will be discussed with reference to FIG. 5. In FIG. 5, a data control apparatus 20 includes partial storage of internal RAM 4A and partial storage of internal ROM 4B in place of the internal storage 4 of the data control apparatus 10 in FIG. 1, and is provided with a RAM disk file system control section 3A and a ROM disk file system control section 3B in place of the file system control section 3.

That is, FIG. 5 shows a configuration example wherein to form storage in the data control apparatus 20, a part of a RAM area and a part of a ROM area in a CPU of the data control apparatus 20 are formed as semiconductor storage by a program and the need for adding new hardware is eliminated.

The partial storage of internal RAM 4A is volatile storage and when the power is turned off, the contents of the storage are lost, but the storage can be accessed at high speed and can be used to save a temporary file of the most recent measurement result, etc. The partial storage of internal ROM, 4B, is nonvolatile storage. Although it takes time in accessing the storage to write, etc., if the power is turned off, the data in the storage is not lost and therefore the storage can be used to save various setting files.

The partial storage of internal RAM 4A and the partial storage of internal ROM 4B are controlled by the RAM disk file system control section 3A and the ROM disk file system control section 3B respectively.

At this time, the partial storage of internal RAM 4A and the partial storage of internal ROM 4B are shared by a host computer 100 and an operation control section 2. Thus, when the partial storage of internal RAM 4A or the partial storage of internal ROM 4B is updated, an event signal is generated for synchronization as in FIG. 1.

The partial storage of internal RAM 4A and the partial storage of internal ROM 4B can be accessed from the host computer 100 and from the operation control section 2 as in FIG. 1.

Figure 6:
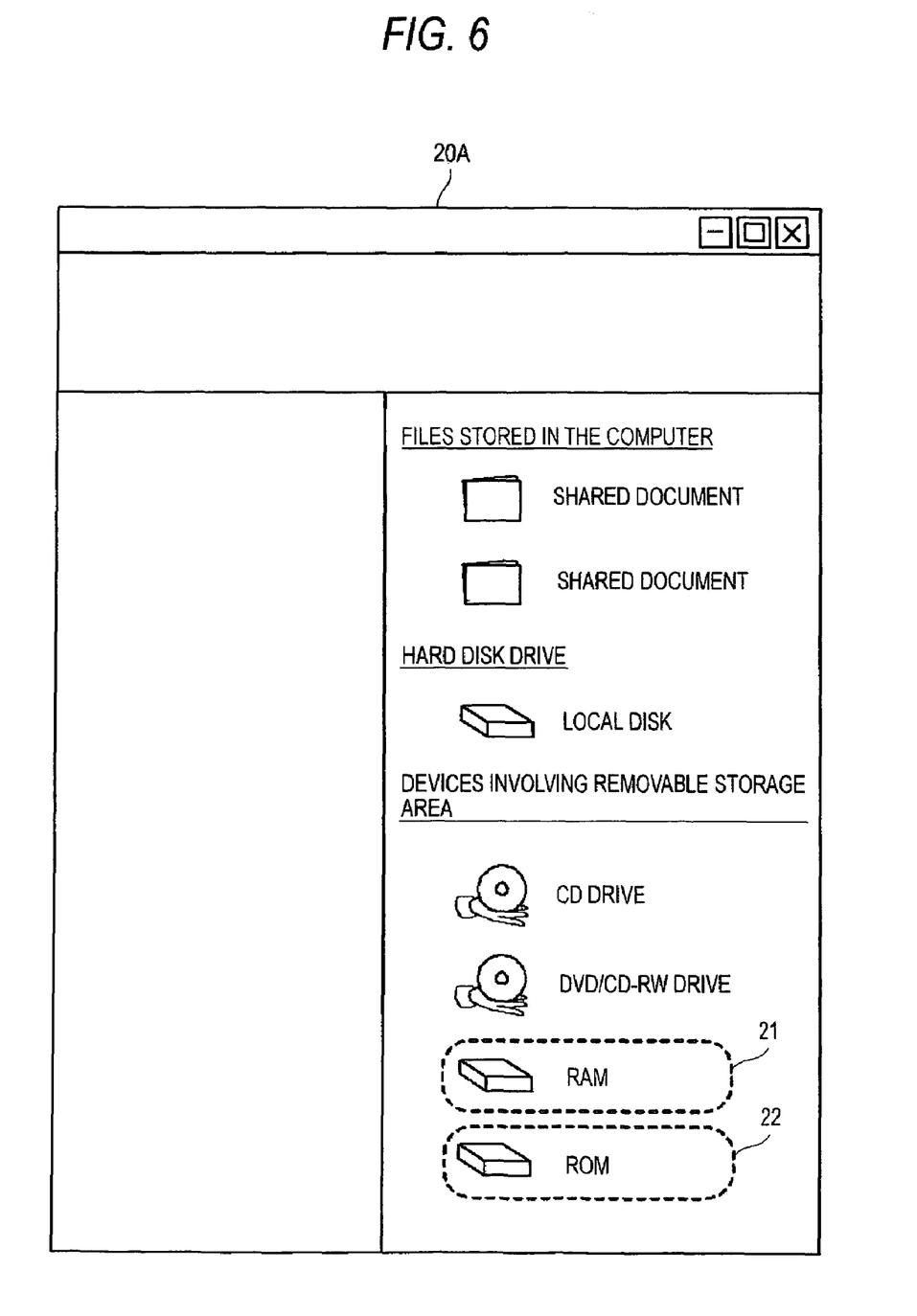
FIG. 6 is a schematic representation of USB mass storage operation in FIG. 5.

FIG. 6 shows an example of a display screen when the data control apparatus 20 in FIG. 5 is connected to the host computer 100. In FIG. 6, the data control apparatus 20 is displayed in a window 20A with names of "RAM (21)" and "ROM (22)" as devices involving a removable storage area.

To provide the data control apparatus 20 with storage, parts of the RAM area and the ROM area in the CPU of the data control apparatus 20 are formed as semiconductor storage, whereby excellent resistance to vibration is provided and new hardware need not be added.

What is claimed is:

1. A data control apparatus, comprising:
a user interface section;
an operation control section which operates based on an instruction from the user interface section;
a USB device interface section which is connected to an external equipment, and controls USB communications with the external equipment;
a file system control section which transfers data to and from the operation control section, and controls a file;
an internal storage which stores data from the file system control section and data from the external equipment; and
a USB mass storage class control section which controls a USB mass storage class, wherein the USB device interface section controls so that the external equipment identifies the data control apparatus as an external storage, and transfers to and from the external equipment, wherein the internal storage comprises:

a first storage; and a second storage, and wherein the file system control section comprises:

a first file system control section for controlling the first storage;

a second file system control section for controlling the second storage, wherein the first storage comprises a part of ROM in a CPU and the second storage comprises a part of RAM in a CPU, the first file system control section comprises a ROM file system control section corresponding to the part of the ROM and the second file system control section comprises a RAM file system control section corresponding to the part of the RAM, and wherein the ROM and the RAM are accessible from the external equipment and the operation control section.

2. The data control apparatus according to claim 1, wherein the data control apparatus is a measuring equipment.

3. The data control apparatus according to claim 1, wherein the data control apparatus is a signal generator.

4. The data control apparatus according to claim 2, wherein the operation control section stores measurement data which is put into a file by the file system control section in the internal storage, transfers the file to the external equipment through the USB mass storage class control section, and identifies a file of data to be input from the user interface and stored in the external equipment.

5. The data control apparatus according to claim 3, wherein the operation control section identifies signal generation data which is input from the user interface and is to be stored in the external equipment through the USB mass storage class control section, and stores the signal generation data in the internal storage, and operates so that a signal is generated based on data put into a file by the file system control section.

6. The data control apparatus according to claim 1, wherein data transferred between the external equipment and the data control apparatus is a file in a CSV format.

7. The data control apparatus according to claim 1, wherein the USB mass storage class control section and the file system control section are both connected to the internal storage.

8. The data control apparatus according to claim 4, wherein a data string file created by the operating control section which is stored in the internal storage can be chosen to be accessed as a file from a plurality of files by the external equipment.

* * * * *